INVENTOR
OLIVER W. BURKE, JR.,
BY
ATTORNEY

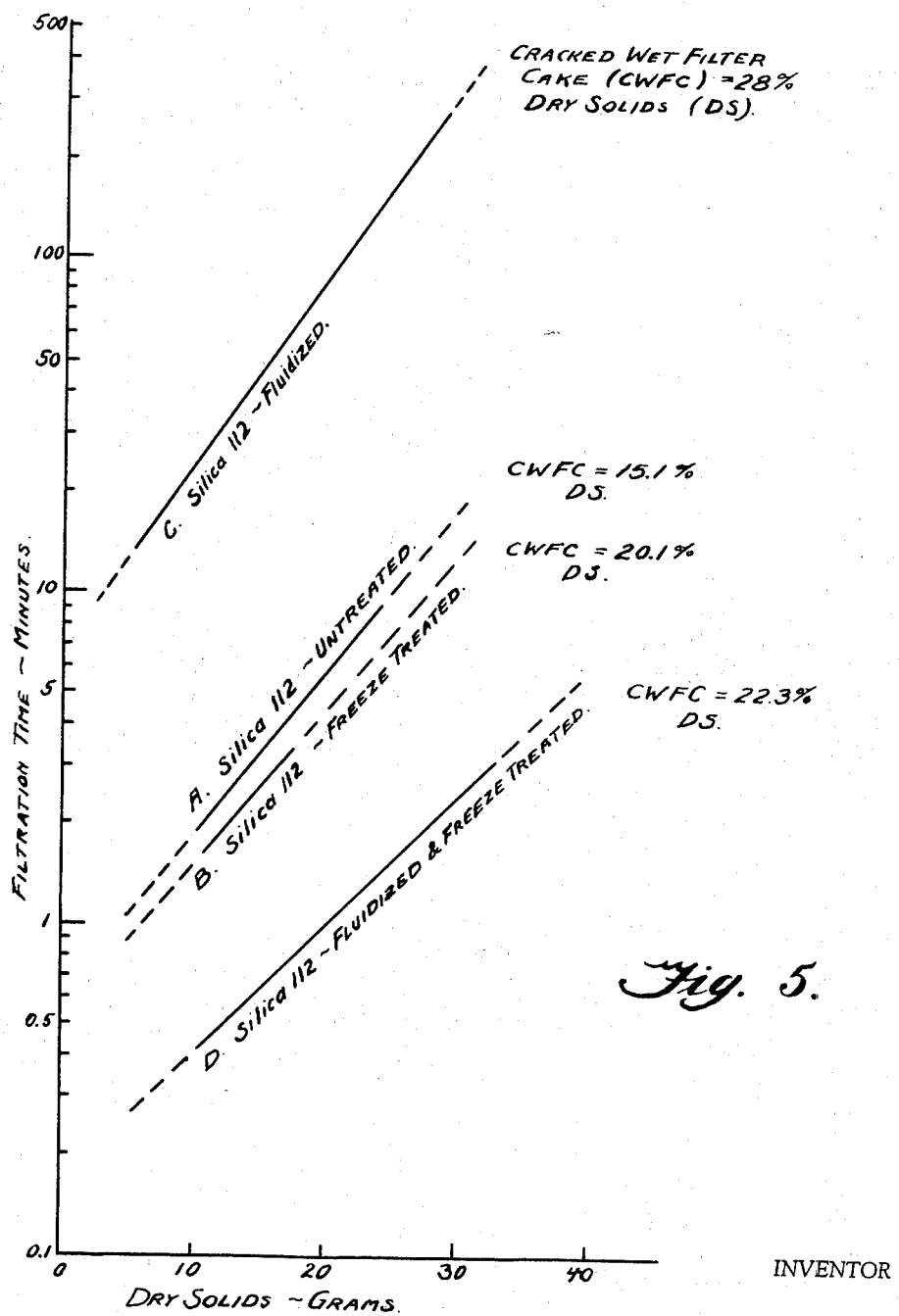

United States Patent Office 3,401,017
Patented Sept. 10, 1968

3,401,017
MODIFIED SILICA PIGMENTS AND PROCESSES
FOR PRODUCING THE SAME
Oliver W. Burke, Jr., Fort Lauderdale, Fla.
(P.O. Box 1266, Pompano Beach, Fla. 33061)
Filed Aug. 16, 1965, Ser. No. 479,806
14 Claims. (Cl. 23—182)

ABSTRACT OF THE DISCLOSURE

The removal of water from wet silica pigment has been difficult because of the slimy or low sedimental character of the silica pigment. To filter well, such pigments must have structures yielding filter cakes of low solids content, which increase drying loads. Herein, the wet silica pigment is subjected to freezing, preferably a slow freezing, followed by thawing. This treatment imparts to the pigment a more sedimental structure and more granuliferous form, which has improved filterability in further treatment, and a reduced drying load. The treatment may also be applied with advantage to wet silica pigment filter cake which has been fluidized by high shear working.

---

Figure 1:
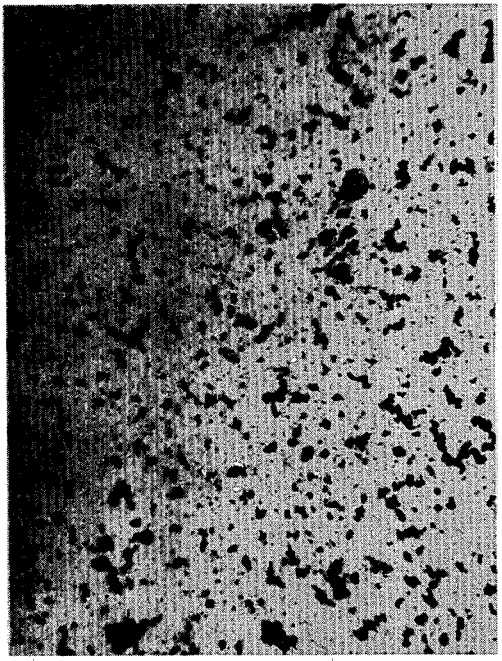

This invention relates to structurally modified silica pigment products prepared from precurser wet silica pigment produced from an aqueous solution of alkali metal silicate and to processes for producing such products, and aims generally to improve the same.

In known processes for the elimination of free water from silica slurry to produce a dry silica pigment product, a large amount of free water has had to be removed by drying at considerable cost in the case of reasonably well filterable wet silica pigments because of the considerable free water retentivity of such wet silica pigments. When the wet silica pigment has had a lower free water retentivity, the dewatering by filtration of slurries of the wet silica pigment has been difficult because of the low sedimental character of the wet silica pigment and the tendency thereof to form an initial water impervious cake.

An object of the present invention is to provide a process for increasing the sedimental nature of and compacting the wet silica particles of a wet silica pigment.

A further object is to provide a wet silica pigment product prepared from a precursor wet silica pigment, which has an increased sedimental nature and a more granuliferous form than the precursor wet silica pigment.

A further object is to provide a process for increasing the solids content of a wet silica pigment before drying thereof, while at the same time improving the sedimental nature and filterability thereof, thereby to reduce the cost of dewatering and drying equipment and of the dewatering and drying operations.

A further object is to provide a wet silica pigment product of the class described, having an increased dry solids content before drying, and having a structure of improved sedimental nature and improved filterability.

A still further object of the invention is to provide a dried silica pigment product prepared from a granuliferous wet silica pigment product and retaining the granuliferous nature thereof.

A still further object of the invention is to provide a dried silica pigment product having a more friable nature than is obtainable by drying the precursor wet silica pigment from which it is prepared.

A still further object is to provide such more friable dry silica pigment product from a precursor wet silica pigment without acidification thereof.

The present invention may be applied generally to wet silica pigment prepared from an aqueous solution of alkali metal silicate. It may be applied to undried precipitated silica pigment prepared by the known processes of the prior art, or to such pigment prepared to augment its filterability by the methods of copending applications Ser. No. 458,131, now Patent No. 3,337,299, and Ser. No. 458,132 or to silica pigment previously prepared to have a free water retentivity somewhat reduced, by the process of my copending application Ser. No. 458,420 filed May 24, 1965, now abandoned. In each instance, by the present invention the structure of the precursor silica pigment is modified in a manner to contribute the improvements above set forth.

Other objects and advantages of this invention will be apparent from the following description of illustrative embodiments thereof, taken in connection with the accompanying drawings wherein FIG. 5 is a chart and FIGS. 1–4 are photomicrographs of said embodiments.

The invention resides in the wet and dry products of improved characteristics, and in the processes of producing the same, as hereinafter described and exemplified, and is more particularly pointed out in the appended claims.

GENERAL DESCRIPTION

Silica pigments prepared by the acidulation of aqueous solutions of alkali metal silicate are well known to the art and are used, inter alia, as pigments for the reinforcement of natural and synthetic rubbers. Such pigments produced from an aqueous solution of alkali metal silicate are subjected to various treatments before drying, e.g. filtration and washing, and preferably treatment with various chemical modifiers such as acid and/or metal salts.

The silica pigments so produced are aggregates of smaller particles and have definite structures. They also have free water retentivity. The free water concerned is that which is retained or occluded by the pigments but which can be removed therefrom by heating at a temperature of 105° C. for a period of 24 hours in a laboratory oven, and is distinguished from the much smaller content of bound water of the pigment, which can only be driven off by heating at ignition temperatures in the range of 1000 to 1200° C.

In copending applications Ser. Nos. 458,131 and 458,132 it is disclosed that the filterability of a slurry of silica pigment produced by the acidulation of an aqueous solution of alkali metal silicate may be improved by conducting at least the critical part of the acidulation in the substantial absence of any significant shear. As therein described, the filter cake from such a slurry has highly augmented free water retentivity, filters rapidly, and washes rapidly on the filter, thus effecting a substantial saving in the time of filtration compared to previously known processes but the filter cake so produced contains only about 9% to 14% solids as an undried cracked standard test filter cake prepared as hereinafter described, i.e. from about 10 parts to 6 parts, preferably 9 to 7 parts, of water for each part of silica therein, by weight, dry basis.

In copending application Ser. No. 458,420 filed May 24, 1965, now abandoned I have disclosed, inter alia, that the free-water retentivity of a slurry of silica pigment produced by the acidulation of alkali metal silicate—either in accordance with prior art processes which afford fair filterability or in accordance with said copending applications Ser. Nos. 458,131 and 458,132 which afford better filterability—may be reduced to a substantial extent by fluidizing the filter cake of relatively high free water content by subjecting it to mechanical shear, i.e. rupture by dynamic impact, sufficiently intense to modify the structure of the water-carrying silica pigment and lower its free water retentivity. Such processing is advantageously employed after the filtration and washing of the silica, and prior to chemical treatment or final filtration thereof, but the reduction in free water retentivity permits the silica to pack to a dense cake on the filter, rendering the filtration slow and rendering the washing of the filter cake more difficult.

The drying of any of such silica pigments thus involves costs which are directly related to the structure and free-water retentivity of the silica. The present invention affords combined methods which can increase the sedimental nature and filterability of a wet silica pigment while decreasing the free water retentivity thereof to thereby effect a marked saving in cost of processing the silica pigment. The present invention also imparts a more granuliferous structure to the wet and dry silica products, and renders the dry products more friable.

Furthermore, in the washing of wet silica pigment, the greater free water retentivity, heretofore required for ease of filtering and washing, required more thorough washing, bcause any salts or other non-volatile materials contained in the free water are concentrated and remain in the silica on drying. The present invention, however, since it reduces the amount of free water and increases the sedimental nature of the wet silica pigment, further reduces the concentration of residues and the thoroughness of washing required, that is to say, the present invention reduces the amount of aqueous liquor required to be dried from the silica by rendering a part thereof supernatant and thus separable from the silica solids by dewatering mechanically (e.g. by filtration, decanting, etc.) which removes the solubles contained in the liquor and thus reduces both the washing load and the drying load.

The free water retentivities of silica pigments are readily measured and compared by the amounts of free water they retain in the form of undried cracked standard test filter cakes. The standard test used herein is made at room temperature (25° C.), with a Buechner funnel type filter having a $\frac{1}{10}$ square foot filter area, using filter cloth, e.g. nylon filter cloth, in place of filter paper, and employing a vacuum of 25±2 inches of mercury. Herein, enough of the slurry of the silica pigment was supplied to form a filter cake which had a thickness when it first cracked of about ½ inch.

The silica pigment thus reduced to an undried cracked standard filter cake is removed from the filter and the weight ratio of occluded free water to the silica pigment, dry basis, is determined by weighing a portion of the cake, drying it to constant weight, e.g. for 24 hours at 105° C. in a laboratory oven, weighing the resulting dry silica pigment, and determining the occluded free water by difference. As previously indicated, the wet precursor silica pigment to which the present invention is applied may have a free-water retentivity such that in the undried cracked standard filter cake it retains occluded free water in the range of about 1 to 10 parts of occluded water per part of silica pigment (dry basis) by weight.

In the practice of the processes of the present invention the said wet precursor silica pigment is subjected to a process which comprises increasing the sedimental character of the wet silica pigment and compacting the wet silica particles thereof by subjecting the free water in the precursor wet silica pigment to freezing and thawing.

In one preferred embodiment of the invention the wet silica pigment subjected to the freezing and thawing is in the form of a wet filter cake.

In another preferred embodiment of the invention the precursor wet silica pigment is reduced to the form of a wet filter cake and then subjected to fluidizing by mechanical working as described in copending application Ser. No. 458,420, now abandoned, before it is subjected to the freezing and thawing steps, the mechanical working preferably being effected under conditions of high shear.

In the practice of the process the freezing and thawing steps compact the wet silica pigment and render supernatant thereto part of the water occluded thereby before such freezing and thawing treatment (hereinafter called "freeze treatment"), which facilitates the separation of the compacted wet silica pigment from such supernatant water.

A silica pigment which has a high water retentivity and which filters reasonably well (see curve A, FIG. 5, hereinafter described) when subjected to the freeze treatment of the present invention, yields a filter cake of increased solids content and, strange to say, one which nevertheless filters more quickly (see curve B, FIG. 5, hereinafter described). This is in marked contrast to the process of copending application Ser. No. 458,420, now abandoned, wherein the fluidizing of such a wet silica pigment by high shear working yields a wet silica pigment which forms a cracked wet filter cake of higher solids content, but only at great sacrifice of filterability, as is exemplified by curve C, FIG. 5, hereinafter more fully described. Astoundingly, however, when the silica of curve A is fluidized to yield the difficultly filterable silica of curve C as a prelude to the freezing and thawing treatment, then as shown by curve D, FIG. 5, the wet silica pigment produced not only yields a cracked wet filter cake of greater solids content (dry basis by weight) than the original precursor silica (curve A) but in addition filters more quickly and readily than does the wet silica pigment produced by the freeze treatment of the original wet silica pigment (curve B).

Figure 2:
Figure 3:
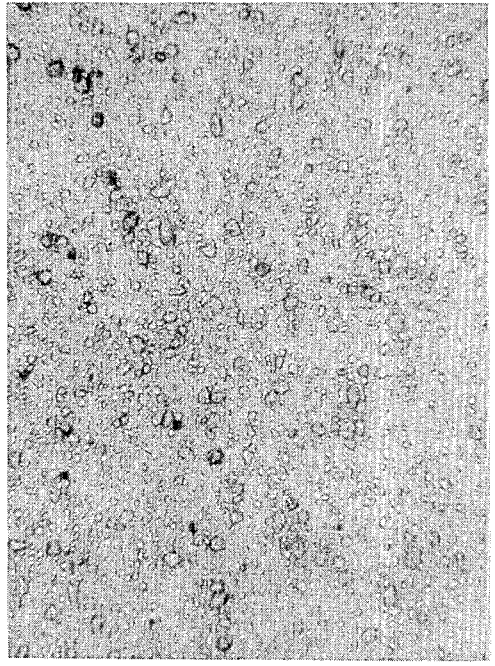
Figure 4:

Also, as is herein described, exemplified, and shown in FIGS. 1–2 and in FIGS. 3–4, the freeze treatment of this invention especially when applied to the fluidized wet silica pigments, produces prepared silica pigment products of new and unique structure, which new products also form a part of the present invention in both wet pigment and dry pigment form.

It is to be borne in mind that in the present specification, when the term "fluidized" is used, this term is intended to connote the treatment of the wet silica pigment by subjecting it to high shear mechanical working, i.e. rupture by dynamic impact, sufficiently intense and prolonged to lower the free water retentivity of the wet silica pigment. Any such shearing cooperates with the freeze treatment in producing advantages of the present invention, however, it is preferred to employ fluidizing of sufficient intensity to increase the dry solids content of the cracked wet filter cake by a factor of at least 10%, and preferably to produce such a cake having a dry solids content by weight, in the range of 24 to 28% or more when shearing with the Waring Blendor, such content of 34% having been obtained when effecting the working with a high shear micropulverizer.

The above general features of the invention, and features contributory thereto in particular embodiments, will be more fully understood by reference to the following examples of procedures and products embodying the invention.

Example I.—Typical preparation of a precursor wet silica pigment

The precursor wet silica pigment employed in all examples herein was prepared according to copending applications Ser. Nos. 458,131 and 458,480, now Patent No. 3,307,906, filed May 24, 1965. In this example 141 kilograms (200 moles $Na_2O/(SiO_2)_{3.22}$) of 41° Bé. commercial sodium silicate was dissolved in 630 liters of water and placed in a 270 gallon reactor agitated with a single blade agitator at 75 r.p.m. The reactor and sodium silicate solution were heated to 80° C. and so maintained.

Carbon dioxide was allowed to flow into the agitated sodium silicate solution at a relative constant rate as set forth in Table A and after 150 minutes 57.6 moles of carbon dioxide had been introduced and the partially acidified sodium silicate solution took on the blue Tyndall effect color. At this time 150 liters of water were quickly added (i.e. in less than 5 minutes) to dilute the sodium silicate and the acidulation with carbon dioxide was continued.

Table A herein sets forth various rates of acidulation with carbon dioxide employed throughout the acidification.

TABLE A.—ACIDULATION RATE

| Time, minutes (cumulative) | CO$_2$, moles (cumulative) | Acidification, percent (cumulative) |
|---|---|---|
| 0 | 0 | 0 |
| 150 | 57.6 | [1] 28.8 |
| 720 | 244 | 122 |

[1] Tyndall effect noticeable and added 150 liters of water.

The silica slurry from the reactor was filtered and washed until the soluble salts of the silica slurry were less than 1% by weight and was then filtered to a cracked wet filter cake which is herein designated Silica 112. This Silica 112 in the examples employing the same hereinafter was used in two forms: (a) with sufficient water to produce a fluid slurry, and (b) in the filter cake form. In both forms it contained bound alkali as Na$_2$O in the range of about 1 to 2% by weight, dry basis, wherefor it is herein called alkaline silica pigment.

Example II.—Typical preparation of a precursor wet silica pigment—metal salt treated A 6,000 gram portion of the washed Silica 112 in the form of 4% slurry (dry basis by weight) and having a pH of 8.2, while agitating was treated with 250 ml. of 10% aluminum sulfate which reduced the pH to 4.0. The so treated silica produced was filtered and is herein designated Silica 112AL, which silica in the examples employing the same hereinafter was used in two forms: (a) with sufficient water to produce a fluid slurry, and (b) in the filter cake form. In place of the aluminum sulfate, equivalent quantities of other salts may be used as set forth in copending application Ser. No. 422,455, filed Dec. 30, 1964, now abandoned. These products are herein called metal salt treated silica pigments.

Example III.—Typical preparation of a precursor wet silica pigment—acid treated

A 9,000 gram portion of the washed Silica 112 in the form of a 7.3% slurry (dry basis by weight) and having a pH of 8.2, while agitating was treated with 125 ml. of 10% sulfuric acid and the pH was 4.5. This acidic silica slurry was filtered and is herein designated Silica 112SA, which silica in the examples employing same was used in two forms: (a) with sufficient water to produce a fluid slurry, and (b) in the filter cake form. These products are herein called acidic silica pigments. In the broader aspects of this invention a precursor wet silica pigment may be both acid treated and metal salt treated, or vice versa, and the products are then called metal salt treated acidic silica pigments.

Example IV.—Typical applications of invention to precursor wet silica pigment

In the applications of the invention set forth in this example (A) a slurry of Silica 112, untreated, (B) a slurry of Silica 112 freeze treated, (C) a fluidized slurry of Silica 112 not freeze treated; and (D) a fluidized slurry of Silica 112 freeze treated, were prepared and the filtration rates determined on the hereinbefore described 0.1 square foot vacuum filter at 24° C., 25±2 inches of mercury, for different quantities thereof to determine the relationship between filtration time and dry solids filtered, for the untreated sample and to illustrate the effect thereon of the treatments of the present invention. The data determined for each of the series of samples A, B, C, and D is set forth in Table I and plotted on a semi-log scale in FIG. 5. As shown by curve A of FIG. 5, the Silica 112 which had been prepared with relatively low shear filtered reasonably rapidly, but had a high free water retentivity and as a cracked wet filter cake contained only about 15.1% solids (dry basis by weight). As shown by curve B, FIG. 5, subjecting this silica to the freeze treatment of this invention somewhat improved the filterability thereof and considerably reduced its water retentivity so that as a cracked wet filter cake it contained over 20% dry solids.

As shown by curve C, FIG. 5, fluidizing of the slurry of Silica 112 for 10 minutes at high speed in the Waring Blendor in accordance with copending application Ser. No. 458,420, now abandoned, very substantially reduced the free water retentivity of the silica, but very greatly increased the time required for filtration thereof. However, when the fluidizing was practiced and then followed by the freeze treatment as shown by curve D, even though in this example the silica was not kept cool during fluidizing (the advantage of which is set out hereinafter) still this treatment improved the filterability even more than the freeze treatment of the original Silica 112 and at the

TABLE I.—EFFECT OF TREATMENT ON FILTRATION RATES FOR SILICA 112

| Sample No. | Sample Quant. (grams) | Solids, total (grams) | Filtration Time (min.) | Filter cake Wet weight (grams) | Wet thickness (inches) | Dry weight (grams) | Solids, total (percent) |
|---|---|---|---|---|---|---|---|
| A—Silica 112, untreated |||||||| 
| A-1 | 138.8 | 13.9 | 2.85 | 89.7 | 7/16 | 13.5 | 15.1 |
| A-2 | 176.1 | 17.6 | 4.17 | 112.9 | 1/2 | 16.7 | 15.0 |
| A-3 | 218.8 | 21.9 | 7.07 | 140.5 | 9/16 | 21.5 | 15.3 |
| Average | | | | | | | 15.1 |
| B—Silica 112, freeze treated [1] ||||||||
| B-1 | 104 | 8.2 | 1.2 | 41.0 | | 8.2 | 20.0 |
| B-2 | 122 | 9.4 | 1.5 | 46.5 | | 9.4 | 20.1 |
| Average | | | | | | | 20.1 |
| C—Silica 112, fluidized [2] ||||||||
| C-1 | 75 | 6.9 | 17.3 | 26.1 | 3/32 | 77.0 | 27.8 |
| C-2 | 150 | 13.8 | 41.2 | 48.1 | 3/16 | 13.8 | 28.3 |
| C-3 | 300 | 27.6 | 242.0 | 101.6 | 3/8 | 28.1 | 27.9 |
| Average | | | | | | | 28.0 |
| D—Silica 112, fluidized,[2] freeze treated [1] ||||||||
| D-1 | [3] 140 | 12.7 | 0.53 | 50.8 | | 10.2 | 20.0 |
| D-2 | [3] 190 | 16.8 | 0.72 | 75.8 | | 16.5 | 21.8 |
| D-3 | [3] 330 | 29.4 | 2.53 | 122.0 | | 29.1 | 23.8 |
| D-4 | [3] 370 | 33 | 3.00 | 139.0 | | 33 | 23.8 |
| Average | | | | | | | 22.3 |

[1] The freeze treatment included freezing the sample overnight and thawing, and in some instances pouring off of supernatant water, prior to filtration.
[2] Fluidized 10 minutes in Waring Blendor, without intermittent cooling.
[3] When this quantity of slurry was fluidized and freeze treated, 45% of the weight of the sample was decanted as supernatant water.

same time yielded a greater reduction of free water retentivity (i.e. higher cake solids) than did the freeze treatment of Silica 112 alone. As is shown hereinafter in connection with Table II, Example 112 (b), col. 8, when the silica is kept cool while being sufficiently fluidized by shear and then freeze treated, the product has a free water retentivity, i.e. cake solids, value closely approaching that obtainable with fluidizing, coupled however, not only with no loss of filterability which accompanies fluidizing, but actually with a substantial gain in filterability, and also with a reduction in filter load due to the ability to pour off 45% of the weight of the sample as water rendered supernatant by the freeze treatment.

Example V.—Further exemplification of the invention applied to precursor wet silica pigments chemically and non-chemically treated The several applications of the invention of this example, for ease of comparison, are compiled in Table II.

In Example V–1–(a), a 9% slurry of a further run of Silica 112 was employed. When a portion of this slurry was pulled down on the filter to a cracked wet filter cake it contained 12.5% solids by weight (dry basis), indicating that it had been prepared with relatively low shear, which in this run was somewhat lower than that under which the silica of curve A, FIG. 1, was prepared. The water being ⅞ of the cracked wet cake and the solids ⅛ thereof, the amount of free water to be removed from the cake by drying to produce a dry silica pigment was 7.0 parts by weight per part of silica pigment, dry basis. This fact and the fact that this silica filtered rapidly, are shown in Table II, col. 4, line V–1–(a).

After processing a portion of the 9% slurry by freeze treatment (frozen overnight and thawed), on pulling down to a cracked cake, the filter cake then obtained contained 20.1 parts by weight of silica pigment, dry basis, Table II, col. 5, line V–1–(a). As tabulated in col. 6 of Table II the practice of the invention thus reduced from 7.0 parts to 4.0 parts the free water retained per part of silica, by weight, amount to a reduction of drying load of 43% from this application of the invention.

Continuing with line V–1–(a), when a portion of the slurry was fluidized by shearing for 10 minutes in the Waring Blendor with intermittent cooling, and then pulled down on the filter to a cracked cake, the cake contained 24.7% solids, dry basis by weight, i.e. contained only 3.0 parts water per part of silica pigment by weight. Thus this practice of the invention reduced the drying load by 57%. In addition, by the freeze treatment the sedimental nature of the silica pigment was increased so that a considerable quantity of the water of the fluidized slurry was rendered supernatant, and by decantation thereof, the filter load and filtration time were further reduced.

In Example V–1–(b) the freeze treatment (B) and the shear fluidizing and freeze treatment (D) were applied to portions of the cracked cake of 12.5% solids content produced by pulling down of the 9% slurry of Example V–1–(a). The freeze treatment (B), in this case reduced the drying load by 47% (col. 7) while the treatment (D) reduced the drying load by 63%, and the filter load and filtration time were also reduced.

Comparison of Examples V–1–(a) and V–1–(b) further illustrates that the invention is more effective in both its aspects when applied to more concentrated slurries, preferably filter cakes, the effectiveness being increased as the quantity of water in the filter cake is reduced.

Examples V–2–(a) and V–3–(a) were practiced in exactly the same way as Example V–1–(a), but using the metal salt treated and the sulfuric acid treated Silicas 112AL and 112SA, respectively, prepared in accordance with Examples II and III above; and Examples V–2–(b) and V–3–(b) were practiced exactly like Example V–1–(b) but using cracked wet filter cake of said silicas, respectively. As shown in col. 1, Table II, the chemically treated silicas had been subjected to some shear in their preparation, and therefore had higher initial cracked wet cake solids (col. 3, item (b) of Table II) and less initial free water retentively (col. 4). Nevertheless, the treatments of the present invention effected worthwhile reductions in drying load and filtering load while reducing the filtration times by factors of the order of those indicated in FIG. 5. When the free treatment is effected more rapidly than in the above examples, e.g. in less than ten minutes as compared to the several hours time employed in freezing the wet silica pigments of the examples herein, the granules obtained by the freeze treatment are somewhat smaller than those shown in FIGS. 2 and 4. Like improvements in cake density, filterability and friability are obtained, and the more slowly frozen samples have been set forth herein to facilitate illustration in the drawings. Similarly, by dilution of the wet silica pigment before freezing and thawing (see Example V–1–a, Table II) reduction in size of the granules is obtained, while still obtaining advantages of the invention.

TABLE II.—REDUCTION OF DRYING LOAD RESULTING FROM PRACTICE OF THE INVENTION

| (1) | (2) | | A. Initial wet silica pigment | | B. Processed by freeze treatment | | | D. Processed by shear fluidizing and freeze treatment | | |
| --- | --- | --- | --- | --- | --- | --- | --- | --- | --- | --- |
| | | | (3) | (4) | (5) | (6) | (7) | (8) | (9) | (10) |
| Ex. No. | Silica No. | Chemical treatment | Dry solids content (percent)[1] | Free water to be removed from cracked filter cake by drying (pts./pt. dry solids) | Dry solids content of wet cracked filter cake (percent) | Free water to be removed from cracked filter cake by drying (pts./pt.dry solids) | Reduction of water to be removed by drying, (percent) | Dry solids content of wet cracked filter cake (percent) | Free water to be removed from cracked filter cake by drying (pts./pt. dry solids) | Reduction of water to be removed by drying (percent) |
| V–1– | [2]112 | None | (a) 9.0 | [3] 7.0 | 20.1 | [4] 4.0 | 43 | 24.7 | [4] 3.0 | 57 |
| | | | (b)12.5 | [3] 7.0 | 21.4 | [4] 3.7 | 47 | 28.0 | [4] 2.6 | 63 |
| V–2– | [5]112AL | Metal salt treatment [6] | (a) 8.3 | [7] 4.6 | 18.2 | [4] 4.5 | 2.2 | 22.8 | [4] 3.5 | 24 |
| | | | (b)17.7 | [7] 4.6 | 18.9 | [4] 4.3 | 6.5 | 24.4 | [4] 3.1 | 33 |
| V–3– | [8]112SA | Acidified [9] | (a) 7.9 | [7] 5.2 | 18.2 | [4] 4.5 | 13 | 20.8 | [4] 3.8 | 27 |
| | | | (b)16.2 | [7] 5.2 | 20.6 | [4] 3.8 | 27 | 28.6 | [4] 2.5 | 52 |

[1] Items (a) were fluid silica pigment slurries; items (b) were wet filter cakes pulled down until cracking appeared; in commercial practice the filter cake (A) is preferably removed from the filter for treatment by Process B, or D, before the appearance of cracks, and thus will contain somewhat more water than a cracked cake; by use of a centrifuge or a pressure filter or a press, filter cakes or press cakes of higher initial solids content can be obtained for use in the practice of this invention.
[2] Initial wet Silica 112 was prepared with relatively low shear.
[3] Filter rapidly.
[4] Filters more rapidly (see Chart, Fig. 1).
[5] Initial silica of 112AL was prepared from Silica 112 with vigorous stirring, involving considerable shear.
[6] Acidified with aluminum sulfate before practicing of steps B or D; acidification may be applied after step B or after step D or after the fluidizing operation C of step D; in place of aluminum sulfate other salts of metals of Groups II–VIII of the Periodic Table may be employed as set forth in copending application Ser. No. 422,455 (case 43+ATM).
[7] Filters slowly.
[8] Initial silica of 112SA was prepared from Silica 112 with less vigorous stirring involving intermediate shear.
[9] Acidified with sulfuric acid before practicing of steps B or D; acidification may be applied after step B or after step D or after the fluidizing operation C of step D; in place of sulfuric acid other acids may be used, including carbon dioxide as set forth in copending application Ser. No. 422,456 (case 43+ATCD).

Example VI.—Demonstration that freeze treatment does not detrimentally effect reenforcing character of silica pigment Further portions of Silica 112SA prepared as set forth in Example III, not freeze treated and freeze treated, respectively, were dried to constant weight at 105° C. and micropulverized and designated as Examples VI–(a) and VI–(b) respectively, and these silicas were each compounded in accordance with the compounding recipe given in Table B.

TABLE B

| Compounding ingredients: | Quantities (wt. parts) |
|---|---|
| Butadiene-styrene copolymer (SBR–1502) | 100 |
| Silica pigment material | 50 |
| Antioxidant (antioxidant 2246) 2,2-methylene-bis (4-methyl-6-t.butylphenol) | 2 |
| Carbon black | 2 |
| Paracoumarone-indene resin (Cumar RH) | 10 |
| Magnesia | 4 |
| Zinc oxide | 1 |
| N-tert-butyl-2-benzothiazole-sulfenamide (Santocure NS) | 0.75 |
| N,N'-di-o-tolylguanidine (DOTG) | 1.5 |
| Sulfur | 3 |
| Triethanolamine | 1 |
| Modified phthalic anhydride (Retarder PD) | 0.75 |
| Monoethanolamine | 1 |

In compounding the stock the selected silica pigment material was milled into SBR–1502 together with the antitoxidant and other compounding ingredient and the stock was aged overnight and then re-milled and cured for 120 minutes at 287° F.

The vulcanizates were then tested and the physical properties thereof were determined as set forth in Table C.

TABLE C

| Example No. | Hardness (Shore A) | Modulus (300% p.s.i.) | Tensile (ult. p.s.i.) | Elong. (percent) |
|---|---|---|---|---|
| A. Not Freeze Treated | | | | |
| VI–(a) | 62 | 1,105 | 3,950 | 585 |
| B. Freeze Treated | | | | |
| VI–(b) | 62 | 745 | 3,880 | 670 |

As is clearly shown in Table C, the freeze-treated silica of this example was a very good elastomer reinforcing pigment. The term "elastomer reinforcing pigment" as used herein denotes a pigment which when used at 50 parts per 100 parts SBR–1502 elastomer will yield a vulcanizate having an ultimate tensile strength of at least 3000 p.s.i.

Example VII.—Product improvement

The silica pigment products produced by practice of the invention, as will be apparent from their modified water retentivity and filterability, are different in character from the precursor silica pigments from which they are prepared.

As previously indicated I attribute these differences to a compaction into a new physical form of the solids contents of the wet precursor pigments, which, strange to say, occurs to a more marked degree when the structure of the precursor wet silica pigment has been disrupted by the high shear fluidizing step than when it has not.

This compaction of the solids, or local compaction, by the freezing and thawing of the free water content of the wet silica pigments, is evidenced by a more grainy or granuliferous appearance of the wet fluided and freeze treated products, and by a more granuliferous appearance and greater friability of the pieces of dried filter cake of the processed pigments as compared to the unprocessed pigments. Indeed in certain instances, by the present invention, I have been able to obtain dried silica pigments of such a friable nature that they will disburse in rubber on the mill or in the Branbury without having to be first micropulverized.

The photomicrographs of FIGS. 1 to 4 of the drawings illustrate new product characteristics resulting from the fluidizing and freeze treatment of the Silicas 112 and 112SA of Table II. The photomicrographs in these figures are all at the same magnification, all the negatives having been taken at 140× and the positives having been made therefrom by contact printing. The scale is shown by the scale mark on FIG. 2.

FIGURE 1 was made from dry silica pigment prepared by drying the filter cake of 12.5% solids content of Example V–1–(b), Table II, col. 3. The dried cake was not micropulverized and a fragment thereof was powdered between the fingers and mixed with turpentine and spread on the microscope slide, focused and photographed. FIG. 2 was made in the same way from a fragment of the dry silica pigment prepared by drying the filter cake of Example V–1–(b), Table II, col. 8.

In like manner FIGS. 3 and 4 were made respectively from dried fragments of the filter cake of Example V–3–(b), col. 3, Table II, and of the filter cake of Example V–3–(b), col. 8, Table II.

Comparing FIGS. 1 and 2 it wil be seen that the fluidized and freeze treated silica pigment (FIG. 2) has been compacted by the treatment into a novel and distinctly different form which we have called granuliferous, in the sense that the small amphorous silica particles of the precursor silica (FIG. 1) have been compacted into granules of distinctly larger size and different character. Surprisingly the treated pigment (FIG. 2) is much more friable in the dried fragment than is the dried filter cake from the precursor silica pigment (FIG. 1).

Similarly in the acid treated silica, FIGS. 3 and 4, the freeze treated silica pigment (FIG. 4) has likewise been compacted into a novel and more granuliferous structure, which is likewise much more friable in the dried fragment than is the dried filter cake from the precursor silica pigment (FIG. 3).

Similar effects are found to a somewhat lesser degree for the aluminum sulfate treated silica pigments.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for preparing a silica pigment product from precursor precipitated wet silica pigment produced from an aqueous solution of alkali metal silicate, which presursor precipitated wet silica pigment has a free water content of about 1 to 10 parts of occluded water per part of silica pigment dry basis (by weight) which process comprises compacting the wet particles thereof by subjecting the free water in the precursor wet silica pigment to freezing and thawing.

2. A process as defined in claim 1, wherein the wet precursor silica pigment subjected to the freezing and thawing is in fluid slurry form.

3. A process as defined in claim 1, wherein the wet precursor silica pigment subjected to the freezing and thawing is in wet pressed cake form.

4. A process as defined in claim 1 wherein the wet precursor silica pigment subjected to the freezing and thawing is in the form of a wet filter cake.

5. A process defined in claim 1, wherein the wet precursor silica pigment is reduced to the form of a wet filter cake and then subjected to fluidizing by mechanical working before it is subjected to the freezing and thawing steps.

6. A process as defined in claim 1, wherein the wet precursor silica pigment is subjected to mechanical working under conditions of high shear before it is subjected to the freezing and thawing steps.

7. A process as defined in claim 6, wherein the precursor wet silica pigment is selected from the group consisting of alkaline silica pigments, acidic silica pigments, metal salt treated silica pigments, and metal salt treated acidic silica pigments.

8. A process as defined in claim 6, wherein the precursor wet silica pigment is selected from the group consisting of alkaline silica pigments.

9. A process as defined in claim 6, wherein the precursor wet silica pigment is selected from the group consisting of acidic silica pigments.

10. A process as defined in claim 6, wherein the precursor wet silica pigment is selected from the group consisting of metal salt treated silica pigments.

11. A process as defined in claim 6, wherein the precursor wet silica pigment is selected from the group consisting of metal salt treated acidic silica pigments.

12. A process as defined in claim 1, wherein the wet precursor silica pigment is subjected to mechanical working under conditions of high shear while its temperature is maintained in the range of between 0° C. and 40° C., before it is subjected to the freezing and thawing steps.

13. A silica pigment product prepared by the process of claim 1.

14. A process as claimed in claim 1, further including the step of mechanically separating from the compacted wet particles the aqueous liquor rendered supernatant thereto by the freezing and thawing, together with any soluble material in the so separated liquor.

References Cited

UNITED STATES PATENTS

| | | | |
|---|---|---|---|
| 2,358,202 | 9/1944 | Berhrman | 23—182 |
| 2,561,304 | 7/1951 | Hazel | 23—182 |
| 2,863,727 | 12/1958 | Thornhill et al. | 23—182 |
| 3,218,726 | 11/1965 | Muir | 28—182 X |
| 3,345,132 | 10/1967 | Wulf | 23—182 |

OTHER REFERENCES

Foote et al.: "The Effect of Freezing on Certain Inorganic Hydrogels," Journ. Amer. Chem. Soc., vol. 38, January-June (1916), pages 603 and 604 relied on.

OSCAR R. VERTIZ, *Primary Examiner.*

A. GRIEF, *Assistant Examiner.*